(No Model.)

G. A. BRACHHAUSEN & P. RIESSNER.
GOVERNOR.

No. 500,372. Patented June 27, 1893.

WITNESSES:
Gustave Dieterich
L. M. Wachschlager

INVENTORS
Gustav A. Brachhausen
Paul Riessner
BY
Briesen & Knauth
ATTORNEYS.

UNITED STATES PATENT OFFICE.

GUSTAV A. BRACHHAUSEN, OF HOBOKEN, NEW JERSEY, AND PAUL RIESSNER, OF EUTRITZSCH, NEAR LEIPSIC, GERMANY.

GOVERNOR.

SPECIFICATION forming part of Letters Patent No. 500,372, dated June 27, 1893.

Application filed December 19, 1892. Serial No. 455,592. (No model.)

*To all whom it may concern:*

Be it known that we, GUSTAV ADOLF BRACHHAUSEN, a resident of Hoboken, Hudson county, State of New Jersey, and PAUL RIESSNER, a resident of Eutritzsch, near Leipsic, Germany, have invented an Improved Fly-Fan or Governor for Music-Boxes, &c., of which the following is a specification, reference being had to the accompanying drawings, forming part hereof, wherein—

Figure 1:
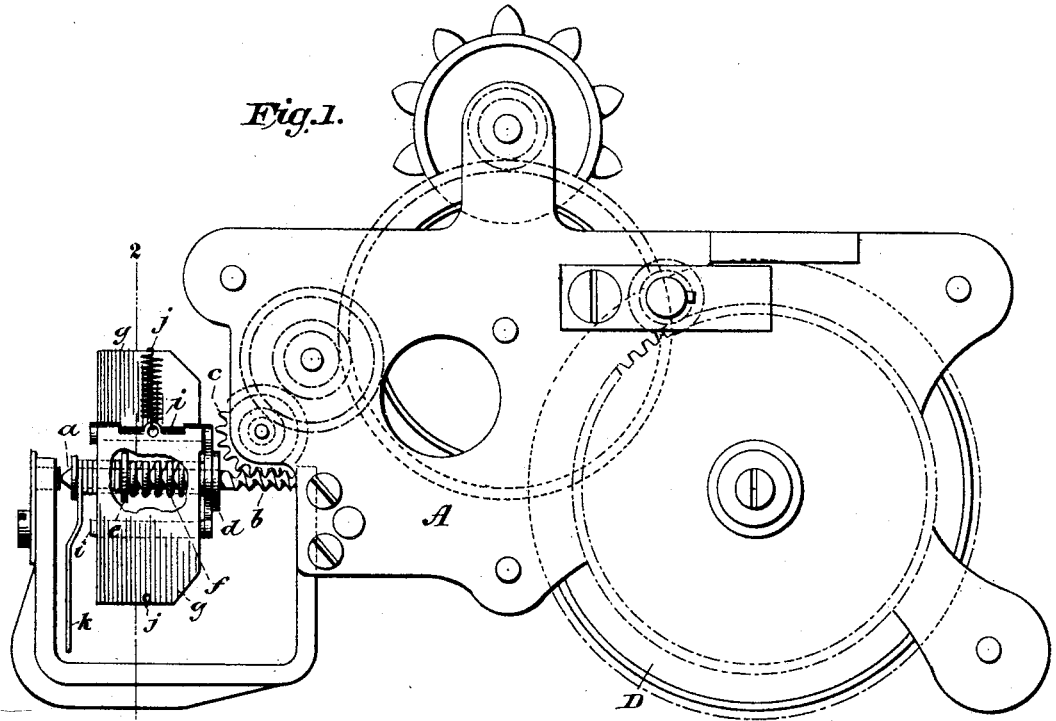
Figures 2, 4:
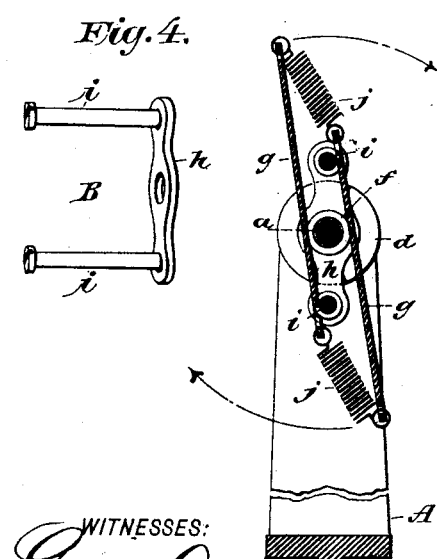
Figure 3:
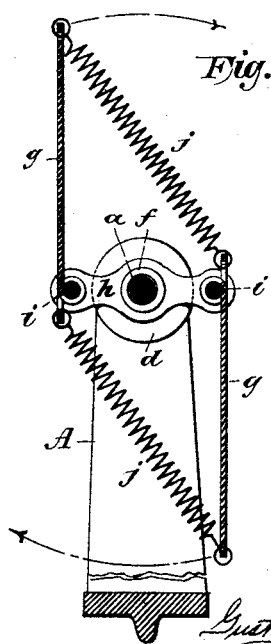

Figure 1 is a side view of a device embodying our improved fly-fan or governor. Fig. 2 is a vertical section on line 2—2 of Fig. 1, showing the fly-fan in normal position. Fig. 3 is a like view with the governor-blades or wings extended. Fig. 4 is a detail perspective view of the blade-holder.

Our invention relates to a new fly-fan or governor, capable of use in any character of machine wherein such devices are employed, but more particularly adapted to music-boxes.

It consists in the novel arrangement and combination of parts more particularly hereinafter described and pointed out in the claims.

It has been found heretofore that in music-boxes and the like the entire mechanism and consequently the tune played would go faster when the device was first wound, and slower as the main spring uncoiled and became weaker.

It is the object of our invention to provide a fly-fan or governor which will cause the device to which it is applied to attain but one normal rate of speed, whether the power applied conforms to that normal or is greater, and thus to overcome the objections heretofore found.

In the drawings A represents a framing for a suitable train of gear, driven in this example by a main spring in a drum D.

$a$ is the governor-shaft which is suitably hung in the frame A and provided with a worm $b$, which engages with a worm-wheel $c$ that is driven by the spring or other source of power.

We do not limit ourselves to the driving mechanism shown, it being understood that any suitable mechanism will answer the purpose.

Rigidly attached to the governor-shaft $a$ are suitable flanges or collars $d\ e$. To the shaft $a$ is swiveled a frame B, carrying the wings or blades $g$ of the fly-fan. This frame or blade-holder is composed of a cross-bar $h$ loosely carried by the governor-shaft $a$ and provided with pins $i\ i$ at or near its ends, as clearly shown in Fig. 4. To these pins $i$ are pivoted the wings $g$ so as to extend in opposite directions. (See Fig. 2.) The free or outer end of each wing is connected by a coiled spring $j$ with the pin $i$ that carries the other blade $g$, or with any other part of the frame B, or if desired with the pivoted end of the other wing or blade.

$k$ is a crank on the shaft $a$, by touching which one can instantly stop its rotation. A coiled spring $f$ is placed on shaft $a$ between the collar $e$ and the cross-bar $h$ of the wing-carrying frame B, holding the latter in frictional contact with the collar $d$.

It will be observed by an examination of Fig. 2 of the drawings that when the machine is at rest (which it is the intention of Fig. 2 to represent) each spring $j$ will tend to draw the free end of the blade $g$ to which it connects as near as possible to the pin $i$ to which said blade is not pivoted, and consequently the two blades overlap in this their normal position throughout the distance between the two pins $i\ i$. Their combined exposed air-resisting surface, therefore, has a length equal to the length of one blade, plus that portion of the other blade which extends outward beyond that one of the pins $i$ to which the same is not pivoted. As now the power is applied to the shaft $a$ and the same rotated in the direction of the arrows in Fig. 2, the blade-carrier or frame B is, owing to its being spring-pressed against the shoulder $d$, carried around with the shaft, and as a consequence each blade is at its pivoted end carried around bodily with the rotary frame B, while at its free end it is pulled along by the spring $j$ connecting therewith. The springs $j$ are so gaged as to strength that when the rotation of the shaft $a$ is slow, they will just be able to carry the blades around with them, leaving them in the position shown in Fig. 2 of the drawings, but as the rotation of the shaft $a$ increases beyond the normal, the power of the springs $j$ will not be able to keep the blades in the position shown in Fig. 2, but will allow the blades to yield to the resistance of the atmosphere, until they assume a position in which their entire surface is exposed to the resisting air, the springs $j$ being meanwhile strained or extended as represented. This gives an increased resisting surface of the blades to the air as compared with that shown in Fig. 2, and causes the apparatus to act as a governor or resistance to the driving power in producing a slowing up of the motion of the shaft $a$, which but for such resistance would run much more violently. The governor action, in being capable of elongating or shortening the exposed surface of the wings, tends therefore to regulate the speed of the shaft $a$ and keep it down to the normal rate, so that as the main spring is first wound, tending to drive the shaft too violently, the wings $g$ will automatically regulate the rotation of said shaft and keep it normal; but as the power of the main spring gradually decreases, the exposed surfaces of the blades $g$ will also gradually become less, and finally when the power of the main spring is normal, the blades will act only as the ordinary fly-blades of well known construction. Fig. 3 shows the blades partly extended, but they can be extended until they are diametrically opposed to one another, when they will have the greatest effect on the air. By swiveling the frame B on the shaft $a$ and employing the spring $f$ to crowd it into frictional contact with the shoulder $d$ of the shaft $a$, we enable this fly or governor to continue its rotation and spend its force, even if by contact with the crank $k$ the rotation of the shaft $a$ be suddenly arrested, thereby obviating any danger of breakage or injury to the delicate parts of which the fly or governor is composed.

We do not wish to limit ourselves to details of construction shown, as many changes might be made without departing from our invention, such as changing the number of wings on the frame B, or to the specific manner in which the same may be hinged or connected with the springs; the principal feature of the invention being the employment of the overlapping wings, which under rapid rotation will gradually reduce the extent to which they overlap one another in the manner described.

We also desire to have it understood that we do not limit the use of these overlapping wings to the combination with a loosely hung carrier B, because even if the carrier B be rigidly mounted upon the shaft $a$ the action of the wings or blades would remain the same as heretofore described.

Having now described our invention, we claim—

1. The combination of the shaft $a$ and means substantially as described for rotating the same, with pins $i$ parallel to said shaft and carried by it, and with wings $g$ pivoted to said pins, and with springs $j$ connected with the outer parts of said wings, all arranged as described so that the wings $g$ shall partly overlap one another in the position of rest but be capable of being brought out of the overlapping position by rapid rotation of the shaft $a$ as described.

2. In a governor or fly-fan, the combination of the fly-shaft $a$, with the wings $g$ carried thereby and with springs connected to said wings, all arranged so that the said wings overlap each other to their greatest extent when the fan is at rest and decrease or increase the extent of the overlap, exposing a greater or less resistance surface, as the shaft $a$ is more or less rapidly rotated, as and for the purpose specified.

3. The combination of the shaft $a$ with the wing-frame B carried thereby, said wing-frame having pins $i$, and with the wings $g$ hinged to the pins $i$, and with the springs $j$ connected to the outer ends of said wings, as and for the purpose specified.

4. The combination of the shaft $a$, having shoulders $d$ $e$, with the wing-frame B loosely placed on said shaft in contact with one of the shoulders, spring $f$ interposed between said wing-frame and the other of said shoulders, and with the wings $g$ and springs $j$, all as and for the purpose specified.

GUSTAV A. BRACHHAUSEN.
PAUL RIESSNER.

Witnesses to Gustav A. Brachhausen:
   HARRY M. TURK,
   OTTO SCHRENK.
Witnesses to Paul Riessner:
   CARL BORNGRAEBER,
   EMIL VOIGTLAENDER.